(12) United States Patent
Craft et al.

(10) Patent No.: US 12,162,667 B1
(45) Date of Patent: Dec. 10, 2024

(54) BEVERAGE CONTAINER

(71) Applicant: Elevated Craft LLC, Scottsdale, AZ (US)

(72) Inventors: Adam Craft, Scottsdale, AZ (US); Zachary Fanning, Phoenix, AZ (US)

(*) Notice: Subject to any disclaimer, the term of this patent is extended or adjusted under 35 U.S.C. 154(b) by 131 days.

(21) Appl. No.: 17/822,781

(22) Filed: Aug. 27, 2022

Related U.S. Application Data

(63) Continuation-in-part of application No. 29/789,573, filed on Sep. 30, 2021, now abandoned.

(51) Int. Cl.
*B65D 81/38* (2006.01)
*B65D 25/56* (2006.01)
*A47J 41/02* (2006.01)

(52) U.S. Cl.
CPC ......... *B65D 81/3881* (2013.01); *B65D 25/56* (2013.01); *A47J 41/02* (2013.01); *B65D 2203/04* (2013.01)

(58) Field of Classification Search
CPC ............ B65D 81/3865; B65D 81/3867; B65D 81/3869; B65D 81/3872; B65D 81/3874; B65D 81/3876; B65D 81/3879; B65D 81/3881; B65D 81/3883; B65D 81/3886
See application file for complete search history.

(56) References Cited

U.S. PATENT DOCUMENTS

| | | | | |
|---|---|---|---|---|
| 2,863,585 A * | 12/1958 | Meshberg | .......... | A47G 19/2288 220/592.17 |
| 3,156,279 A * | 11/1964 | Grebowiec | ........ | A45D 40/0068 215/44 |
| 9,555,949 B1 * | 1/2017 | French | ...................... | F25D 3/08 |
| 9,580,229 B2 | 2/2017 | Thomas | | |
| 10,005,608 B1 | 6/2018 | Jacob | | |
| 11,484,138 B2 * | 11/2022 | Smith | .................. | B65D 21/086 |
| 2014/0319158 A1 | 10/2014 | Lonsway | | |
| 2018/0110350 A1 | 4/2018 | Bingham | | |
| 2020/0253401 A1 * | 8/2020 | Haas | ..................... | A47J 41/024 |
| 2021/0139226 A1 | 5/2021 | Monaghan et al. | | |

* cited by examiner

*Primary Examiner* — Javier A Pagan
(74) *Attorney, Agent, or Firm* — IPTechLaw

(57) ABSTRACT

Implementations of beverage container may include an outer container, an inner container configured to removably couple within the outer container, a seal ring directly coupled to an inner perimeter of the outer container, the seal ring includes a plurality of openings wherein the plurality of openings are configured to fully close upon the inner container being fully inserted within the outer container. The seal ring is configured to lock the inner container within the outer container through a pressure differential.

19 Claims, 11 Drawing Sheets

BEVERAGE CONTAINER

CROSS REFERENCE TO RELATED APPLICATIONS

This application is a continuation-in-part application of the earlier U.S. Design Patent Application to Elevated Craft LLC entitled "Beverage Container," application Ser. No. 29/789,573, filed Sep. 30, 2021, now pending, the disclosure of which is hereby incorporated entirely herein by reference.

BACKGROUND

1. Technical Field

Aspects of this document relate generally to beverage containers. More specific implementations involve a beverage container with an outer and inner container coupled to one another through a seal ring.

2. Background

Beverage containers are used to hold a beverage for consumption by an individual. Beverage containers may be opened or have a reclosable opening. Various beverage containers may be insulated to maintain the temperature of the beverage.

SUMMARY

Implementations of a beverage container may include an outer container, an inner container configured to removably couple within the outer container, and a seal ring directly coupled to an inner perimeter of the outer container. The seal ring may include a plurality of openings. The plurality of openings may be configured to fully close upon the inner container being fully inserted within the outer container. The seal ring may be configured to lock the inner container within the outer container through a pressure differential.

Implementations of a beverage container may include one, all, or any of the following:

Implementations of the beverage container may include an outer container having vacuum insulated double walls.

Implementations of the beverage container may include an inner container having measurement markings oriented in a frontwards direction when viewed from an interior of the inner container.

Each opening of the plurality of openings may include a slit that is accessible from an inner perimeter of the seal ring.

Implementations of the beverage container may include a seal ring having a plurality of flaps with each flap of the plurality of flaps separated from an adjacent flap by an opening of the plurality of openings.

The seal ring may be made of a rubber material.

A sidewall of the inner container may only contact a sidewall of the outer container at an end of the outer container including the opening.

Implementations of a beverage container may include an outer container and an inner container configured to removably couple within the outer container. The inner container may include a tapered sidewall. A seal ring may be directly coupled to an inner perimeter of the outer container and the seal ring includes a plurality of openings. The plurality of openings may be configured to allow air within the outer container escape therethrough when the inner container is being inserted into the outer container and the plurality of openings are configured to close when the inner container is inserted completely in the outer container. The seal ring may be configured to lock the inner container within the outer container through a pressure differential.

Implementations of beverage containers may include one, all, or any of the following:

The plurality of openings may include a plurality of slits accessible from an inner perimeter of the seal ring.

The seal ring may include a plurality of flaps, each flap separated from an adjacent flap by an opening of the plurality of openings.

Each flap may include a C-shape.

Each flap may include an S-shape.

Each opening of the plurality of openings may be a closed opening.

The seal ring may have an outer portion directly coupled to the outer container and an inner portion directly coupled to the inner portion. A gap may separate the inner portion from the outer portion.

Implementations of beverage containers may include an insulated outer container and an inner container configured to removably couple within the insulated outer container. The inner container may have a tapered sidewall. Implementations of beverage containers may include a seal ring directly coupled to an inner perimeter of the insulated outer container. The seal ring may include a plurality of slits accessible from an inner perimeter of the seal ring. The plurality of slits may be configured to allow air within the insulated outer container escape therethrough when the inner container is being inserted into the insulated outer container. The plurality of slits may be configured to close when the inner container is inserted completely in the insulated outer container and the seal ring is configured to lock the inner container within the insulated outer container through a pressure differential.

Implementations of beverage containers may include one, all, or any of the following:

The inner container may include a first set of measurement markings oriented in a frontwards direction when viewed from an interior of the inner container and a second set of measurement markings oriented in the frontwards direction when viewed from the interior of the inner container.

A vacuum may be configured to be formed within the insulated outer container when the inner container is inserted completely within the insulated outer container.

The inner container may include a portion with an outer diameter either the same size or larger than a diameter of an outer perimeter of an end of the insulated outer container including an opening.

The insulated outer container may be vacuum insulated.

The seal ring may include an outer portion directly coupled to the insulated outer container and an inner portion directly coupled to the inner container. A gap may separate the inner portion from the outer portion.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended beverage container will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such beverage container and implementing components and methods, consistent with the intended operation and methods.

Figure 1:
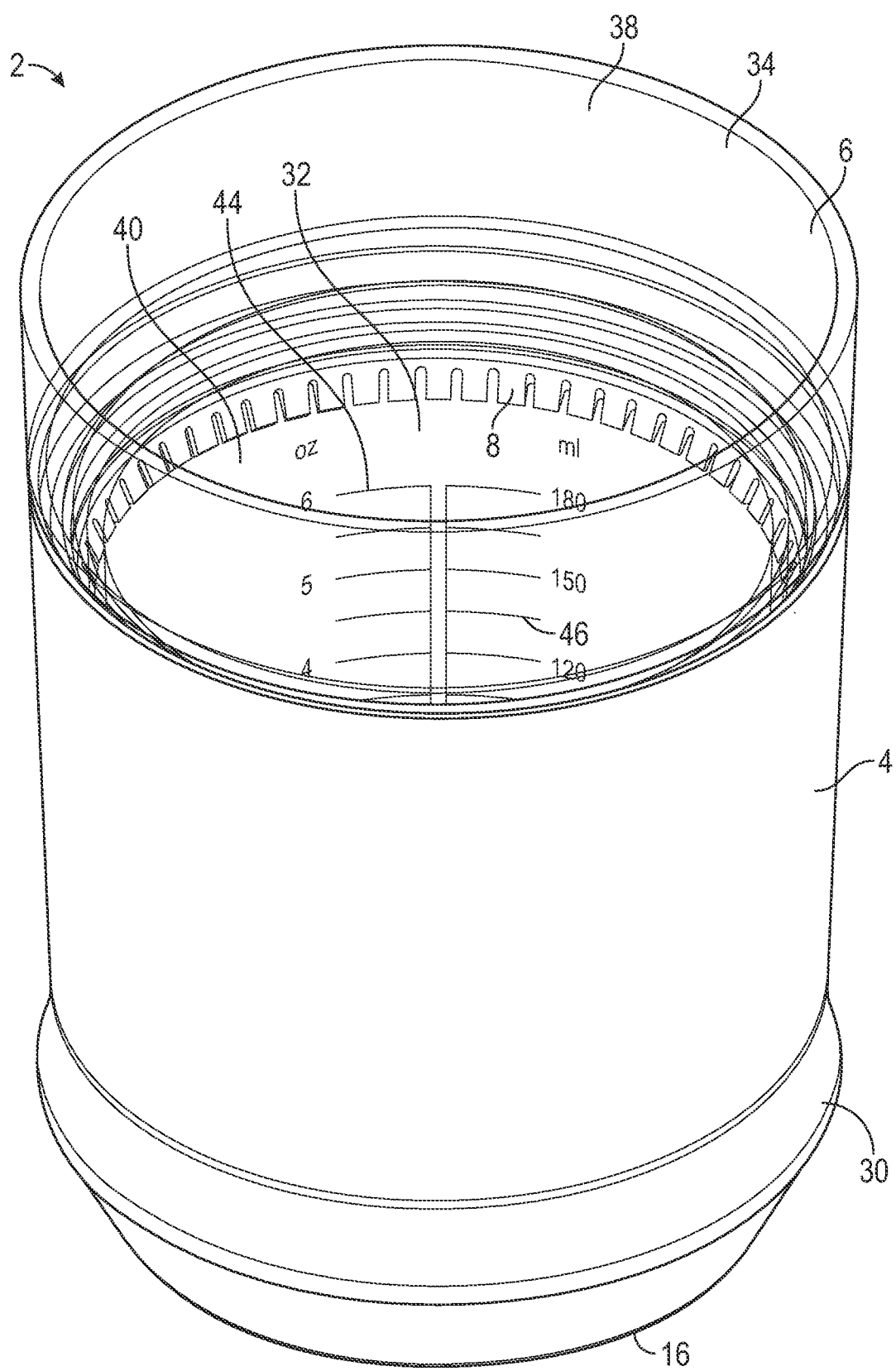
FIG. 1 is a front perspective view of a beverage container.
Figure 2:
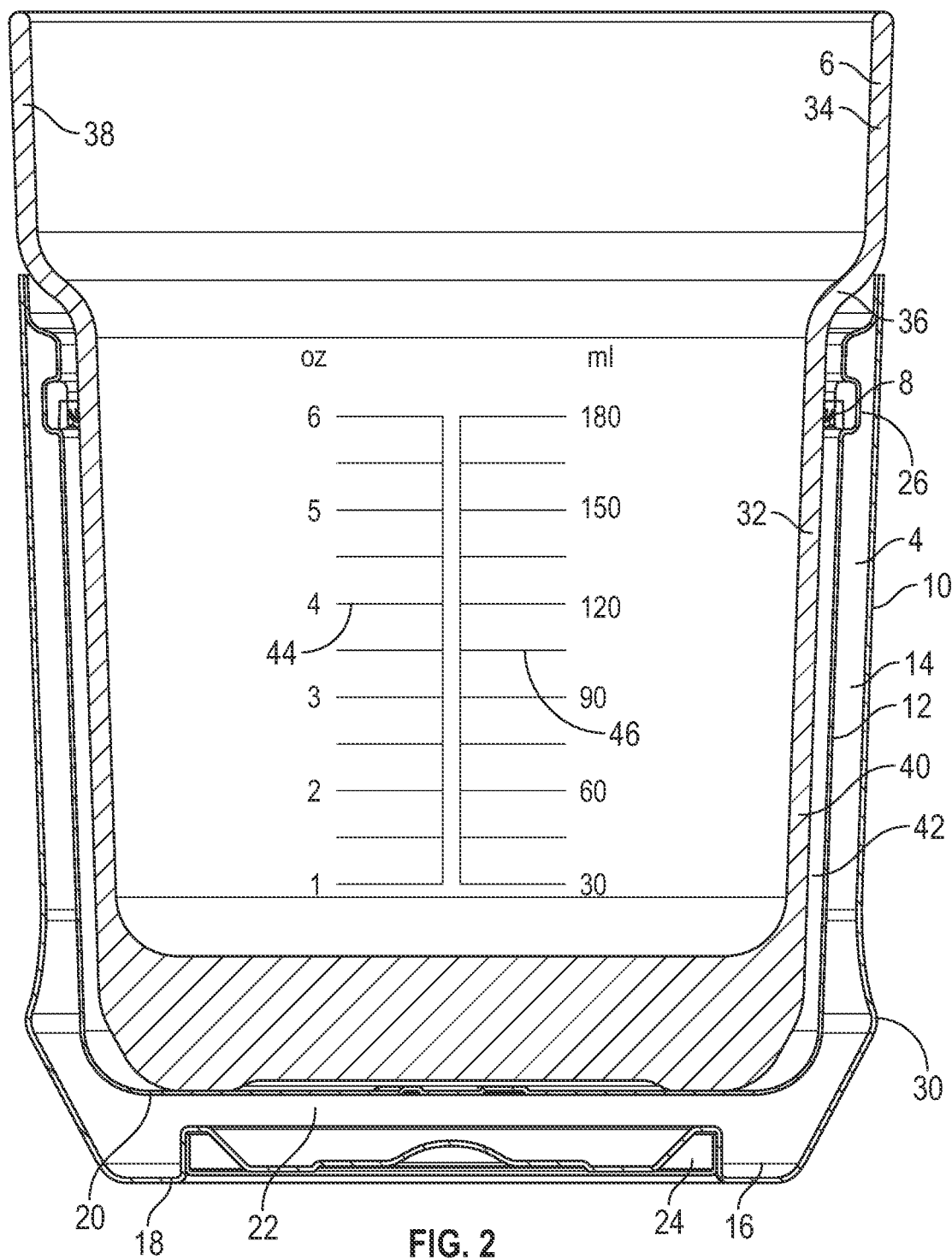
FIG. 2 is a cross sectional view of the beverage container of FIG. 1.

Referring to FIGS. 1-2, an implementation of a beverage container is illustrated. Referring to FIG. 1, a front perspective view of a beverage container is illustrated. Referring to FIG. 2, a cross sectional view of the beverage container of FIG. 1 is illustrated. As illustrated by FIGS. 1-2, implementations of the beverage container includes an inner container 6 removably coupled within an outer container 4. Implementations of the containers disclosed herein include a seal ring 8 through which the inner container 6 is secured to the outer container 4.

Figure 3:
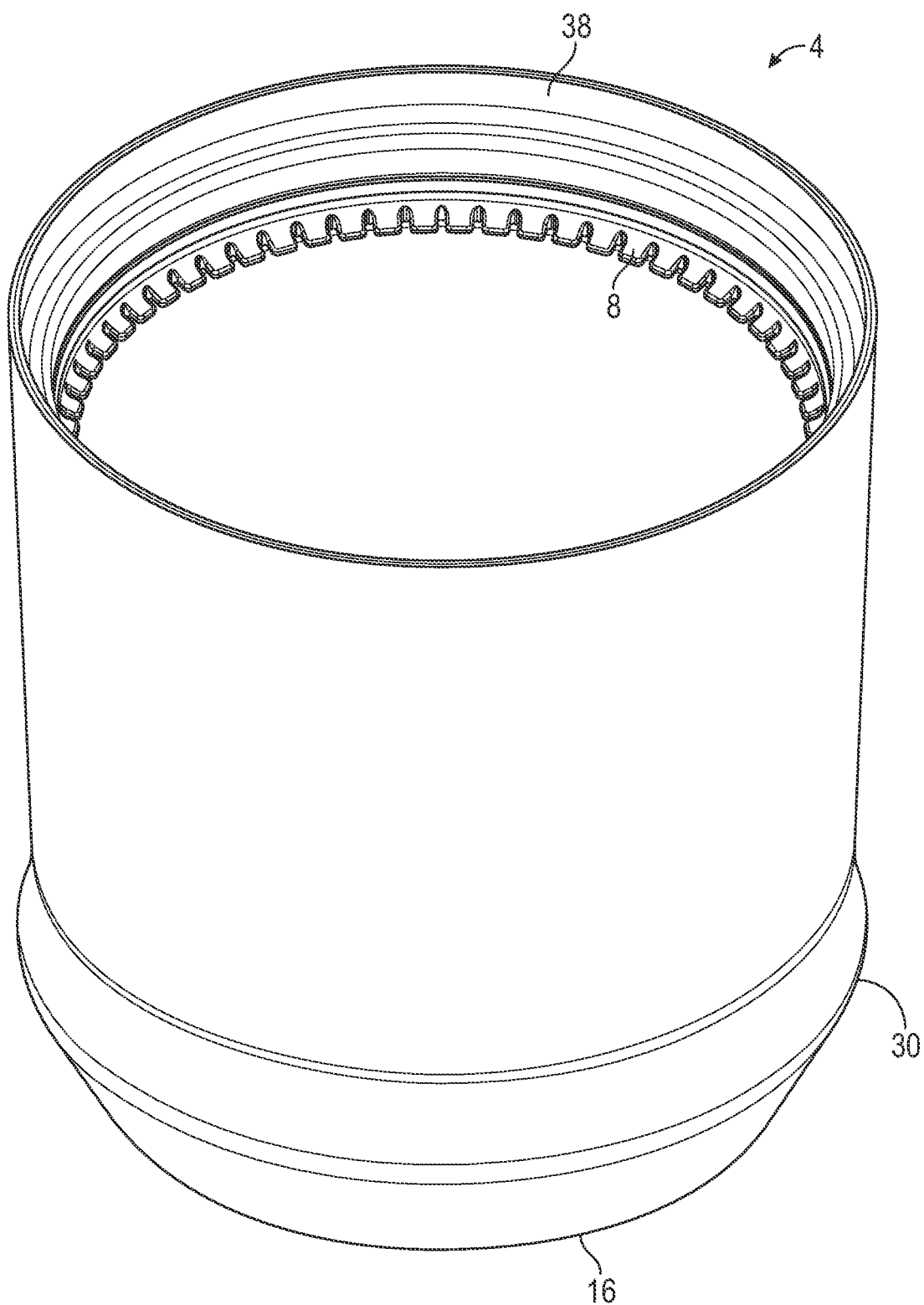
FIG. 3 is a front perspective view of the outer container of the beverage container of FIG. 1.
Figure 4:
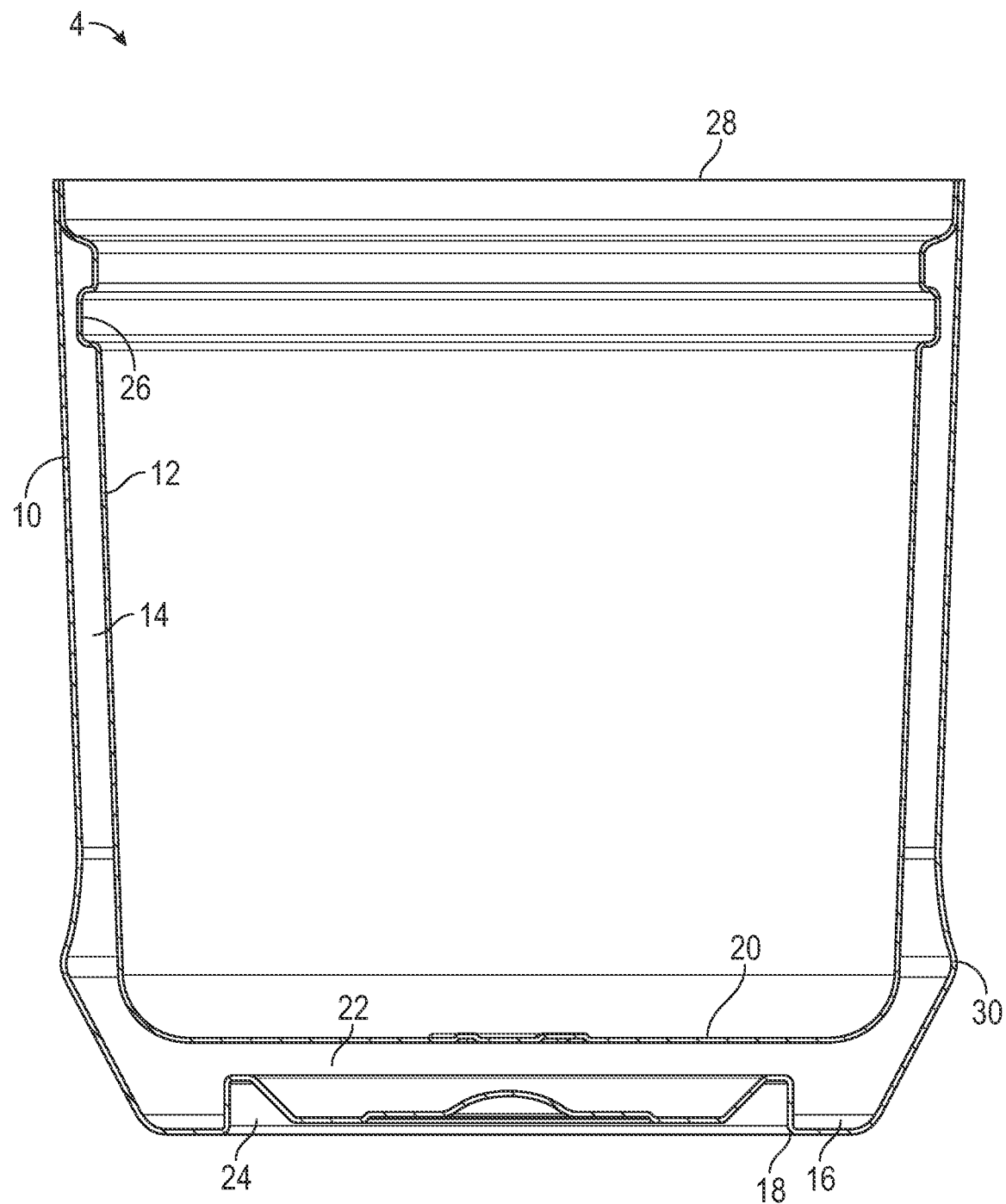
FIG. 4 is a cross sectional view of the outer container of FIG. 3.
Figure 5:
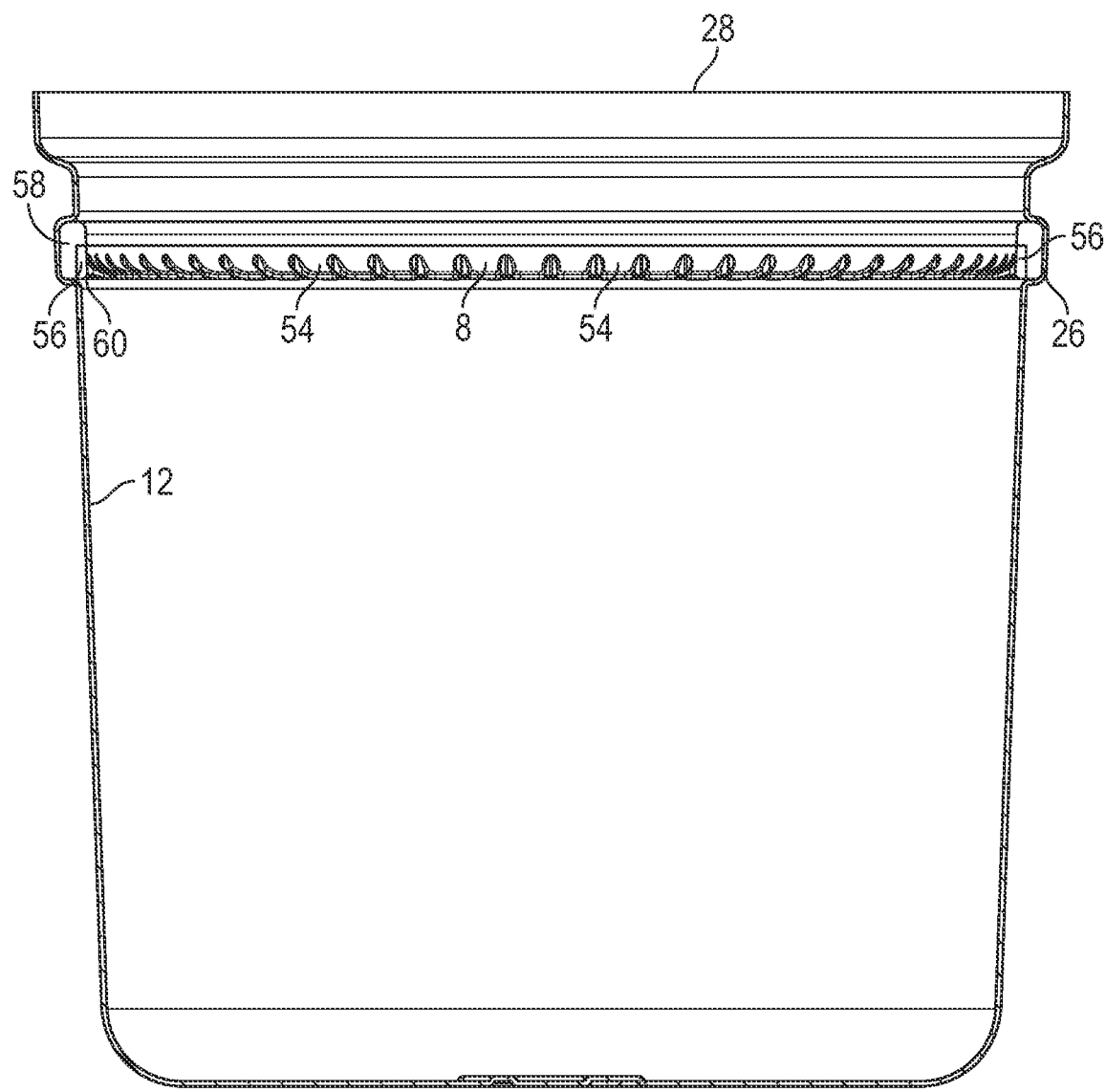
FIG. 5 is a cross sectional view of the outer container of FIG. 3 including a seal ring.

Referring to FIG. 3, a front perspective view of the outer container of the beverage container of FIG. 1 is illustrated. Referring to FIG. 4, a cross sectional view of the outer container of FIG. 3 is illustrated. Referring to FIG. 5, a partial cross sectional view of the outer container of FIG. 3 including a seal ring is illustrated. The cross sectional view of FIG. 5 is partial inasmuch as it only includes the inner wall of the outer container. Referring to FIGS. 2 and 4, in various implementations the outer container 4 may include double walls. In such implementations the double walls include an outer sidewall 10 and an inner sidewall 12. In various implementations, the double walls may be vacuum insulated double walls. In other implementations the double walls may not be vacuum insulated but may include an insulative material in the space 14 between the outer sidewall 10 and the inner sidewall 12. In other implementations, the outer container 4 may not include double walls but may include a single wall.

Still referring to FIGS. 1-5, the outer container includes a base 16. In various implementations, and as illustrated by FIGS. 2 and 4, the base 16 may include double base walls having an outer base wall 18 and an inner base wall 20. In such implementations, the base 16 may be vacuum insulated. In other implementations the base 16 may not be vacuum insulated but may include an insulative material in the space 22 between the outer base wall 18 and the inner base wall 20. In other implementations, the base 16 may not include double base walls but may include a single base wall.

In implementations where the outer container 4 is insulated, the outer container may be configured to better maintain the temperature of a beverage within the inner container 6 when the inner container is within the outer container. In such implementations, the outer container may eliminate the need for a coaster as condensation does not develop on the outer surface of the outer container due to the insulated properties of the outer container 4.

In various implementations, the base 16 may include a recess 24 formed therein. In such implementations, the recess 24 may be configured to receive an insert. The insert may be of the same material as the outer container 4 or of a different type of material as the outer container. The insert may include a logo or design thereon or therein.

In various implementations, and as illustrated by FIGS. 2 and 4-5, the inside of the inner sidewall 12 of the outer container 4 may include a groove 26 circumscribing the interior of the outer container and configured to receive the seal ring 8. The groove 26 may be located closer to the opening 28 of the outer container 4 than to the base 16 of the outer container.

In other implementations the interior of the outer container may not include a groove. In such implementations, the seal ring may be secured to the interior of the outer container through an adhesive or other securing mechanism.

In various implementations the outer container 4 may be substantially cylindrical. In other implementations the outer container may be substantially a rectangular prism having 5 faces (the sixth face would be open). In still other implementations, the outer container may comprise other types of shape configured to receive an inner container that holds a beverage.

In various implementations, and as illustrated by FIGS. 1-4, the outer container 4 may include a lip 30 extending around a perimeter of the outer container. In particular implementations, the lip 30 may extend around the perimeter of a lower portion of the outer container. In other implementations, the lip 30 may extend around the perimeter of a different portion of the outer container.

In various implementations, the outer container 4 may be made from, by non-limiting example, a metal (such as stainless steel), a polymer, a composite or any other sufficiently rigid and durable material.

Figure 6:
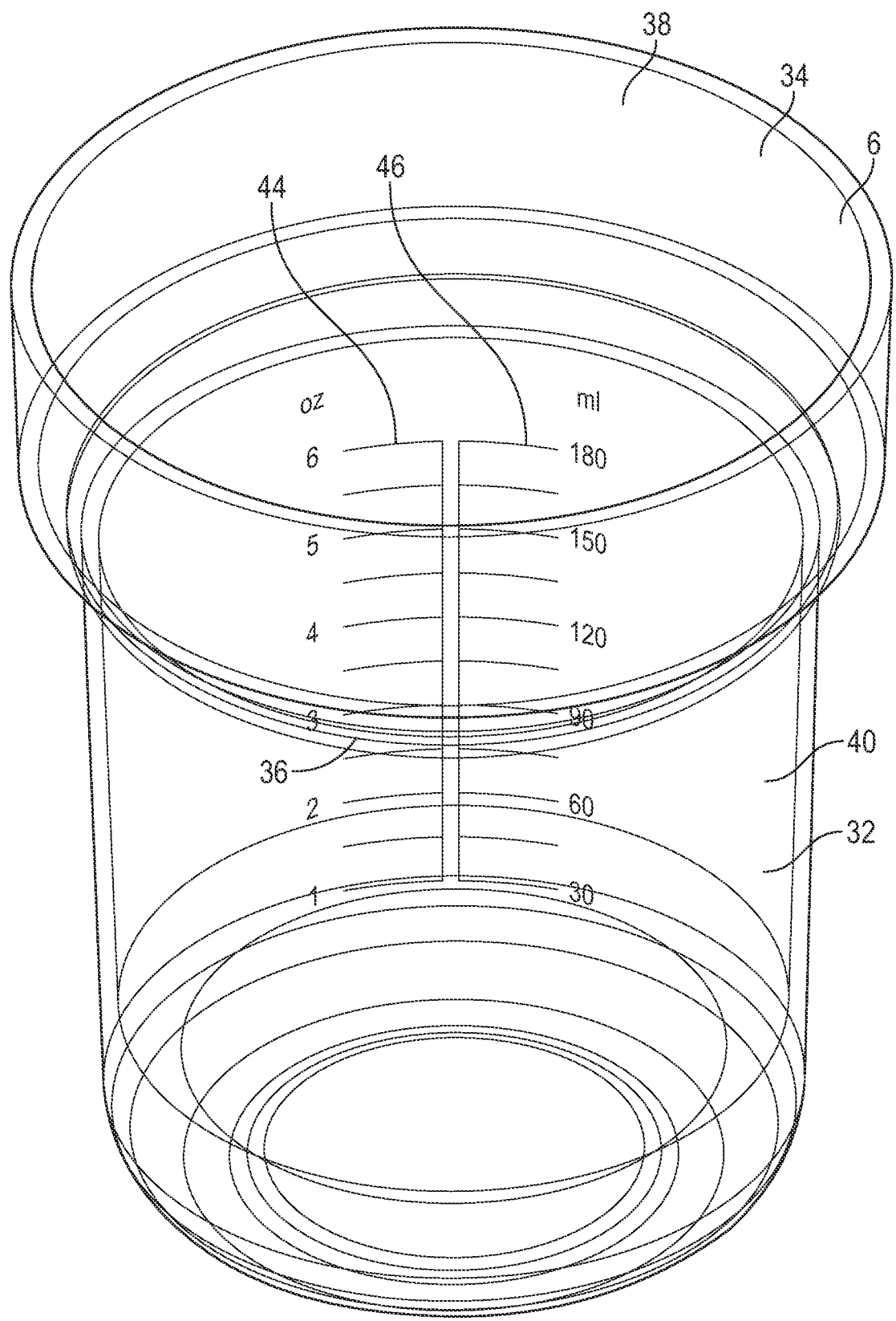
FIG. 6 is a front perspective view of the inner container of the beverage container of FIG. 1.

Referring to FIGS. 1 and 2, the inner container 6 is illustrated within the outer container 4. Referring to FIG. 6, a front perspective view of the inner container of the beverage container of FIG. 1 is illustrated. As illustrated by FIGS. 1, 2 and 6, the beverage container 2 includes an inner container 6 removably coupled within an outer container 4.

The inner container 6 includes a shape corresponding to the shape of the interior of the outer container. Accordingly, and by non-limiting example, in implementations where the outer container 4 is substantially cylindrical, the inner container may also be substantially cylindrical. As illustrated by FIGS. 1, 2 and 6, the inner container 6 includes a first portion 32 configured to be inserted within the outer container 4 and a second portion 34 configured to extend out from the outer container when the inner container 6 is fully inserted within the outer container. The second portion 34 may be the portion of the inner container 6 configured to contact a user's lips while drinking from the container to. In such implementations, the user's lips do not contact the outer container 4. In various implementations, the inner container may include a step 36 between the first portion 32 and the second portion 34. In such implementations, the second portion may be configured to rest directly over and on the upper edge of the outer container 4. In such implementations, the second portion 34 includes a diameter larger than the largest diameter of the first portion. The diameter of the second portion 34 may also be the same size or larger than the diameter of the outer perimeter of the end of the outer container having the opening. In various implementations, opposing sides of the sidewall 38 of the second portion may be parallel. In other implementations, the opposing sides of the sidewall 38 may taper inwards towards the first portion 32 of the inner container.

In various implementations, the first portion 32 includes a sidewall 40 having opposing sides that taper in towards the closed base of the inner container 6. In implementations where the inner container is substantially cylindrical, the first portion 32 may form a lower frustoconical shape inasmuch as the sidewall 40 is tapered towards a substantially flat base of the inner container 6. The taper of the sidewall 40 may be minor (thus the inner container 6 is still substantially cylindrical) and at an angle that allows for openings within a seal ring to remain open while the inner container is inserted within the outer container until at least the majority of the inner container is inserted within the outer container, at which point the openings in the seal ring are forced closed by the sidewall 40.

The inner container 6 is configured to be secured within the outer container 4 through the seal ring 8. The first portion 32 of the inner container 6 is configured to directly contact the seal ring 8 and be locked in place through the creation of a pressure differential by the seal ring 8.

In various implementations, and as illustrated by FIG. 2, a gap 42 may be present between the sidewall 40 the inner container 6 and the inner sidewall 12 of the outer container 4. In such implementations, the inner container 6 only contacts the sidewall of the outer container 4 at the end of the outer container including the opening 28. In other implementations, the inner container 6 may only contact the base of the outer container 4 while not contacting the sidewall of the outer container. In still other implementations, the inner container 6 may contact only the sidewall of the outer container 4 at the end of the outer container including the opening 28 as well as the base of the outer container while maintaining a gap between the sidewall of the inner container and the sidewall of the outer container.

Still referring to FIGS. 1, 2 and 6, in various implementations the inner container 6 includes one or more sets of measurement markings. In particular implementations, and as illustrated, the inner container 6 includes a first set of measurement markings 44 and a second set of measurement markings 46. In other implementations, the inner container 6 may include only a single set of measurement markings or more than 2 sets of measurement markings. The one or more sets of measurement markings may be printed, inscribed, or otherwise formed on either the exterior of the sidewall 40 of the first portion 32 of the inner container 6 or the interior of sidewall of the first portion of the inner container. The measurement markings may include units of, by non-limiting example, ounces or milliliters.

In various implementations, and as illustrated by FIGS. 1, 2 and 6, the one or more sets of measurement markings may be oriented in a frontwards direction when viewed from the interior of the inner container 6. As used herein, "frontwards direction" means a direction which is read from left to right. In such implementations, a user is able to utilize the measurement markings by looking in the interior of the inner container 6 even when the inner container is within the outer container 4.

In various implementations, the inner container 6 may be made from, by non-limiting example, borosilicate glass or any other material sufficiently hard and durable.

Referring to FIGS. 1, 2, 3, 5 and 7, the seal ring 8 is illustrated. The beverage container includes the seal ring 8 coupled to an inner perimeter of the outer container 4. In various implementations, the seal ring 8 may be secured within a groove within the inner perimeter of the outer container 4. In other implementations, the seal ring 8 may be secured to the inner perimeter of the outer container through an adhesive or securing mechanism. In still other implementations, the seal ring 8 may be secured within a groove around the inner perimeter of the outer container 4 and by an adhesive. In various implementations, the seal ring 8 may be fixedly coupled within the outer container 4, while in other implementations the seal ring 8 may be removably coupled within the outer container 4. While the seal ring of FIGS. 1-3 and 5 is illustrated as near the upper end of the outer container, in other implementations the seal ring may be positioned lower and closer to the base of the upper container.

Figure 7:
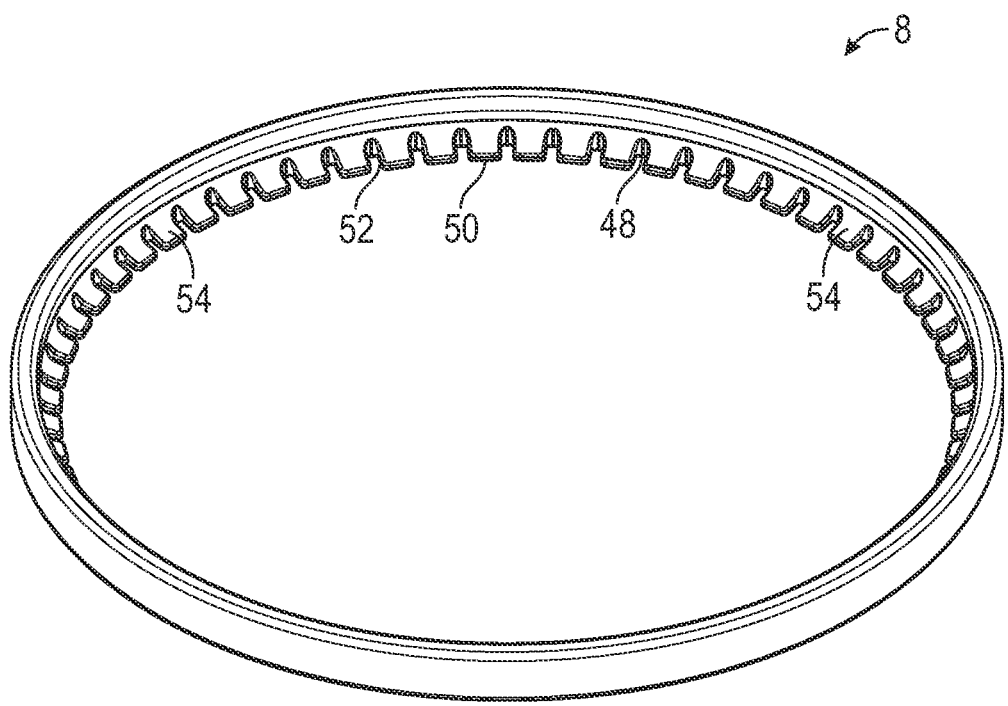
FIG. 7 is a front perspective view of the seal ring of the beverage container of FIG. 1.

Referring specifically to FIG. 7, a front perspective view of the seal ring of the beverage container of FIG. 1 is illustrated. In the implementations disclosed herein, the seal ring 8 is made from a flexible material such as, by nonlimiting example, a rubber, other polymer, composite, or other flexible material.

In various implementations, the seal ring 8 includes a plurality of openings 48 therein. The plurality of openings 48 may include a plurality of slits 52 accessible from an inner perimeter 50 of the seal ring 8. In other implementations, such as the implementations of the seal rings of FIGS. 8 through 11, the seal ring may include a plurality of closed openings. In implementations including the plurality of slits 52, the seal ring 8 also includes a plurality of flaps 54. Each flap of the plurality of flaps 54 is separated from an adjacent flap by a slit of the plurality of slits 52.

Referring back to FIG. 5, a cross-sectional side view of the seal ring 8 within the outer container is illustrated. As illustrated, the seal ring 8 may include an outer portion 58 directly coupled to the outer container and an inner portion 60 configured to directly couple to the inner container when the inner container is inserted within the outer container. In various implementations, and as illustrated by FIG. 5, a gap 56 is configured to separate the outer portion 58 from the inner portion 60. In such implementations, the gap may extend around the entire circumference of the seal ring 8. In implementations including a plurality of flaps 54, the plurality of flaps may all be included in the inner portion 60. In various implementations, the gap 56 between the outer portion 58 and inner portion 60 may be closed when an inner container is inserted within an outer container and pushes the inner portion 60 against the outer portion 58 of the seal ring 8.

In the implementations of beverage containers disclosed herein having a seal ring 8 with a plurality of openings 48, the plurality of openings 48 are configured to remain open when the inner container 6 begins to enter the outer container 4. While the plurality of flaps 54 may contact the inner container 6 as it enters the outer container 4, air from within the outer container that is displaced by the inner container entering the outer container is allowed to escape through the plurality of openings 48. In implementations where the inner container 6 includes a tapered sidewall, the size of the plurality of openings 48 may decrease as the inner container is inserted more fully within the outer container. This occurs from the size of the diameter of the inner portion in contact with the seal ring 8 increasing and pushing the seal ring 8 outwards, in turn reducing the size of the plurality of openings 48.

The plurality of openings 48 are configured to fully close upon the inner container 6 being fully inserted within the outer container 4. In various implementations, the plurality of openings 48 may be configured to fully close within an inch of the inner container 6 being fully inserted within the outer container 4. In implementations where the plurality of openings close prior to the inner container being fully inserted within the outer container, a user may be required to rock the inner container 6 as it is inserted entirely within the outer container 4 in order to break the seal of the seal ring 8, or reopen one or more closed openings of the plurality of openings 48, to allow the inner container to be fully inserted within the outer container and to allow the remaining air within the outer container displaced by the inner container to escape by reopening the closed openings through the rocking motion of the inner container.

Once the plurality of openings 48 are fully closed, when a force pulls the inner container 6 in a direction away from the outer container 4, a pressure differential is created between the space within the outer container between the outer container 4 and the inner container 6 and the ambient air pressure. More specifically, when a force pulls the inner container 6 in a direction away from the outer container 4, because the plurality of openings 48 are closed and the volume between the outer container and the inner container is sealed, the ambient air pressure becomes greater than the pressure between the outer container and the inner container and the inner container is in turn secured, or locked, to the outer container. In other words, when the inner container is inserted completely within the outer container and the plurality of openings within the seal ring are closed, a vacuum is formed within the outer container when the inner container is pulled in a direction away from the outer container. Accordingly, the seal ring is configured to lock the inner container within the outer container through a pressure differential. In such implementations, when the beverage container 2 is used by a user it may feel as though the beverage container is made of one unitary piece inasmuch as the inner container 6 is securely locked within the outer container 4. Further, the user need not worry about the inner container 6 becoming separated from the outer container 4 during typical use of the beverage container 2, such as holding the beverage container upright by the inner container 6.

In implementations where the seal ring 8 locks the inner container 6 within the outer container 4 through the pressure differential, or through the formation of a vacuum within the outer container, a user may remove the inner container from the outer container by breaking the seal formed by the seal ring 8, which includes at least partially reopening one or more openings of the plurality of openings. The seal may be broken by pulling the inner container 6 away from the outer container 4 while rocking the inner container back and forth.

Referring to FIGS. 8-11, implementations of seal rings having closed openings therein are illustrated. The seal ring 8 of FIG. 1 may be replaced by any of the seal rings of FIGS. 8-11 which may function the same as the seal ring of FIG. 1 inasmuch as each of the seal rings include a plurality of openings that remain open as an inner container is inserted within the outer container until the inner container is fully inserted, or nearly fully inserted, within the outer container, at which point the plurality of openings are closed and a vacuum is created within the outer container through the seal ring. While not clearly illustrated by the views of FIGS. 8-11, it is understood that the seal rings of FIGS. 8-11 may include an outer portion configured to directly contact an outer container, an inner portion configured to directly contact the inner container, and a gap between the outer portion and the inner portion which may be closed upon the inner container being fully inserted within the outer container.

Figure 8:
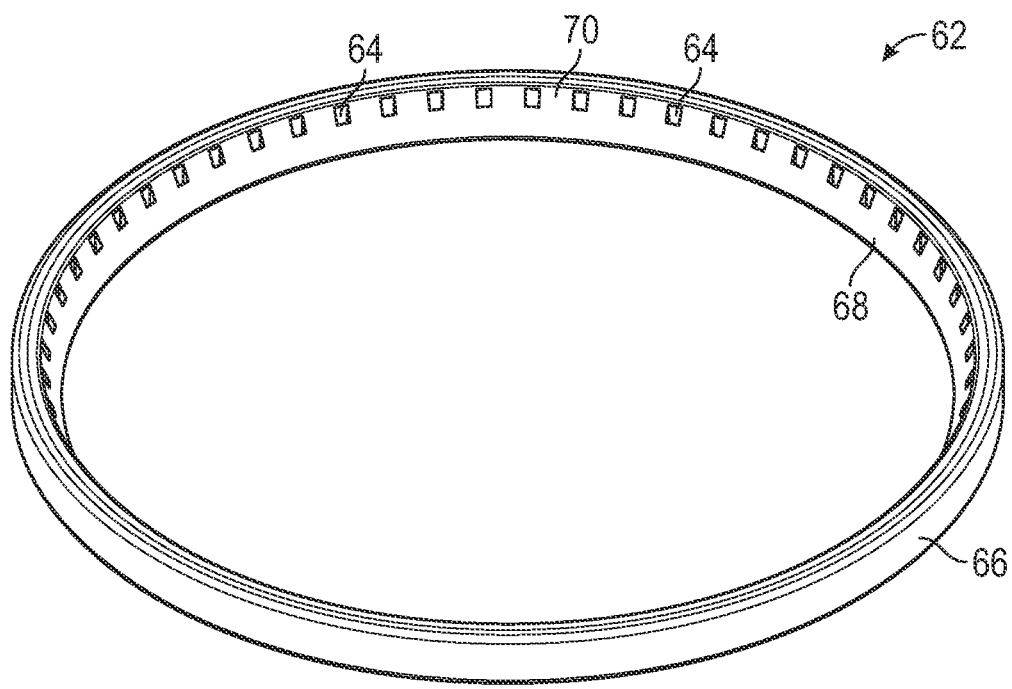
FIG. 8 is a front perspective view of a second implementation of a seal ring.

Referring specifically to FIG. 8, a front perspective view of a second implementation of a seal ring is illustrated. In various implementations, the seal ring 62 may include an outer portion 66 configured to directly contact an outer container, an inner portion 68 configured to directly contact an inner container, and a gap between the outer portion and the inner portion which may be closed upon the inner container being fully inserted within the outer container. As illustrated, the inner portion 68 may include a plurality of closed openings 64 therethrough. The plurality of closed openings 64 may be located through an outer portion 70 of the inner portion 68. In various implementations, the plurality of openings 64 may be in the shape of substantially a square. Similar to the plurality of slits 52 of FIG. 7, the plurality of closed openings 64 allow for an inner container to be secured within an outer container through a pressure differential created by the seal ring 62.

Figure 9:
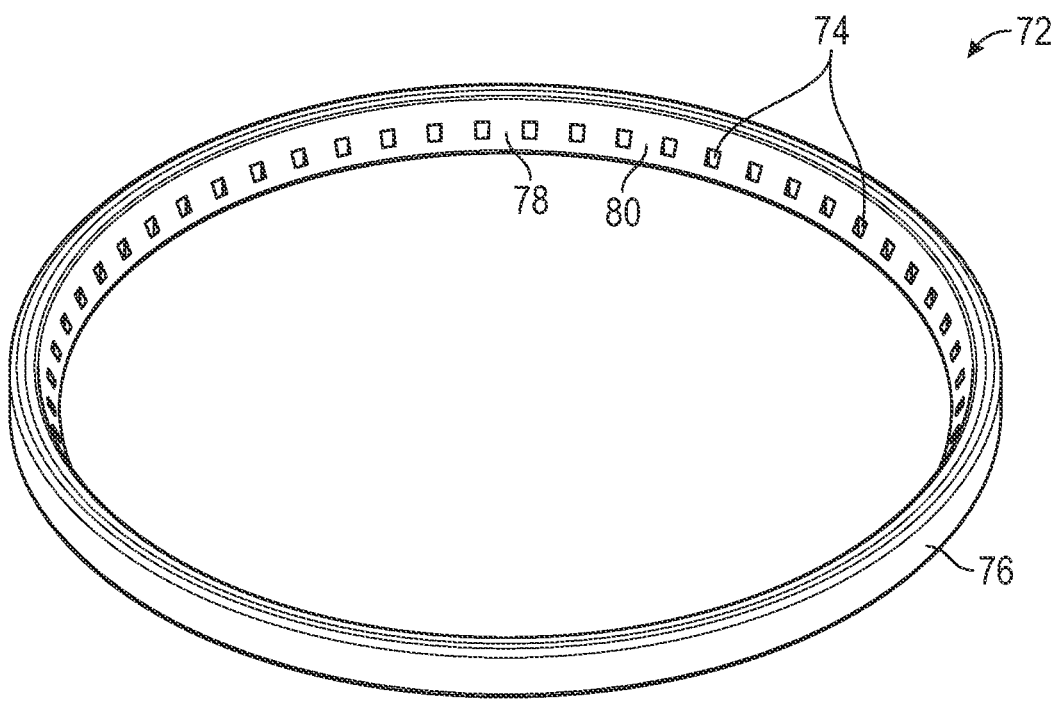
FIG. 9 is a front perspective view of a third implementation of a seal ring.

Referring specifically to FIG. 9, a front perspective view of a third implementation of a seal ring is illustrated. In various implementations, the seal ring 72 may include an outer portion 76 configured to directly contact an outer container, an inner portion 78 configured to directly contact an inner container, and a gap between the outer portion and the inner portion which may be closed upon the inner container being fully inserted within the outer container. As illustrated, the inner portion 78 may include a plurality of closed openings 74 therethrough. The plurality of closed openings 74 may be located through an inner portion 80 of the inner portion 78. In various implementations, the plurality of openings 74 may be in the shape of substantially a square. Similar to the plurality of slits 52 of FIG. 7, the plurality of closed openings 74 allow for an inner container to be secured within an outer container through a pressure differential created by the seal ring 72.

Figure 10:
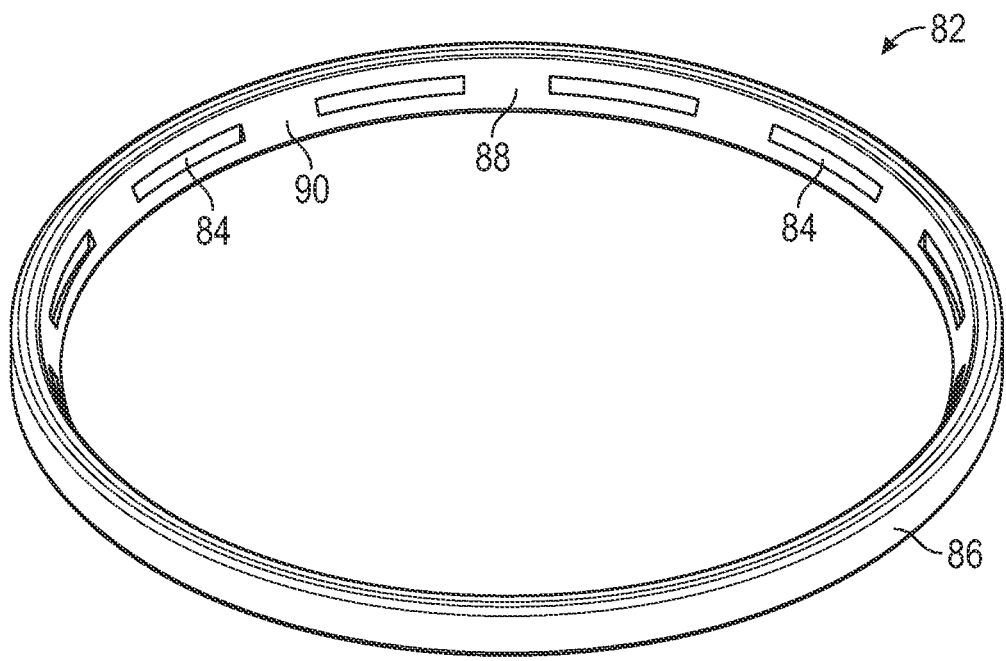
FIG. 10 is a front perspective view of a fourth implementation of a seal ring.

Referring specifically to FIG. 10, a front perspective view of a fourth implementation of a seal ring is illustrated. In various implementations, the seal ring 82 may include an outer portion 86 configured to directly contact an outer container, an inner portion 88 configured to directly contact an inner container, and a gap between the outer portion and the inner portion which may be closed upon the inner container being fully inserted within the outer container. As illustrated, the inner portion 88 may include a plurality of closed openings 84 therethrough. The plurality of closed openings 84 may be located through a middle portion 90 of the inner portion 88. In various implementations, the plurality of openings 84 may include rectangular shaped openings elongated along the length of the seal ring 82. Similar to the plurality of slits 52 of FIG. 7, the plurality of closed openings 84 allow for an inner container to be secured within an outer container through a pressure differential created by the seal ring 82.

Figure 11:
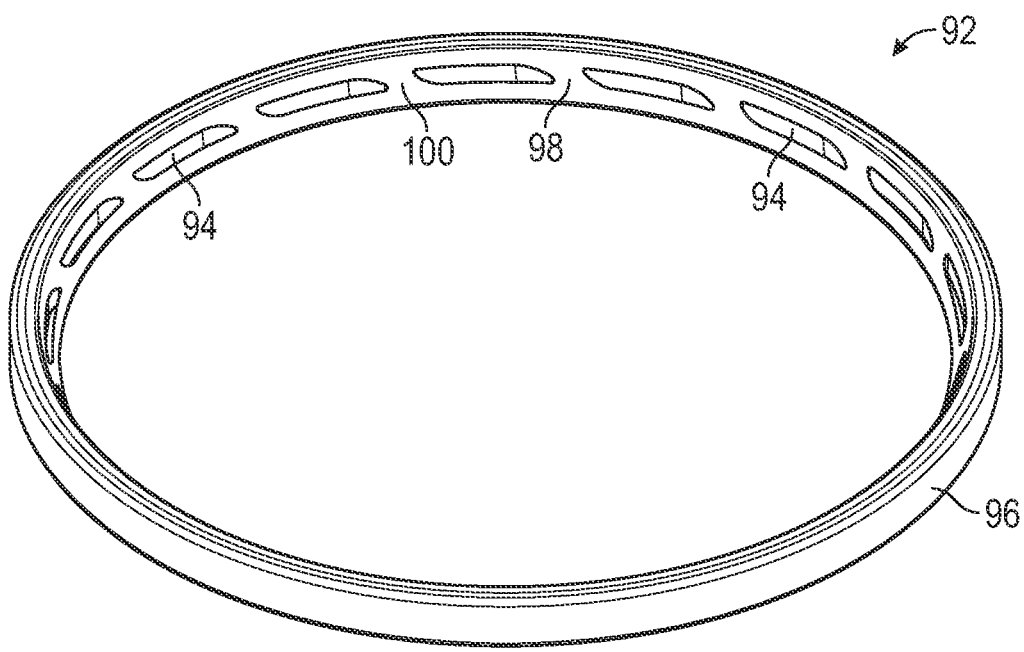
FIG. 11 is a front perspective view of a fifth implementation of a seal ring.

Referring specifically to FIG. 11, a front perspective view of a fifth implementation of a seal ring is illustrated. In various implementations, the seal ring 92 may include an outer portion 96 configured to directly contact an outer container, an inner portion 98 configured to directly contact an inner container, and a gap between the outer portion and the inner portion which may be closed upon the inner container being fully inserted within the outer container. As illustrated, the inner portion 98 may include a plurality of closed openings 94 therethrough. The plurality of closed openings 94 may be located through a middle portion 100 of the inner portion 98. In various implementations, the plurality of openings 94 may include rounded parallelogram shaped openings elongated along the length of the seal ring 92. Similar to the plurality of slits 52 of FIG. 7, the plurality of closed openings 94 allow for an inner container to be secured within an outer container through a pressure differential created by the seal ring 92.

While FIGS. 8-11 illustrate implementations of seal rings having particular closed openings therethrough, in other implementations the seal ring may include other shapes of openings which may be located at other portions of the seal ring. Further, while the seal rings of FIG. 7 through 11 all illustrate the plurality of openings as extending through an inner portion of the seal ring, in other implementations the seal ring may not include an inner portion and an outer portion separated by a gap. In such implementations, the seal ring may still include a plurality of openings through the seal ring that are configured to lock an inner container within an outer container through a pressure differential similar to the functionality of the seal ring of FIG. 7.

Figure 12:
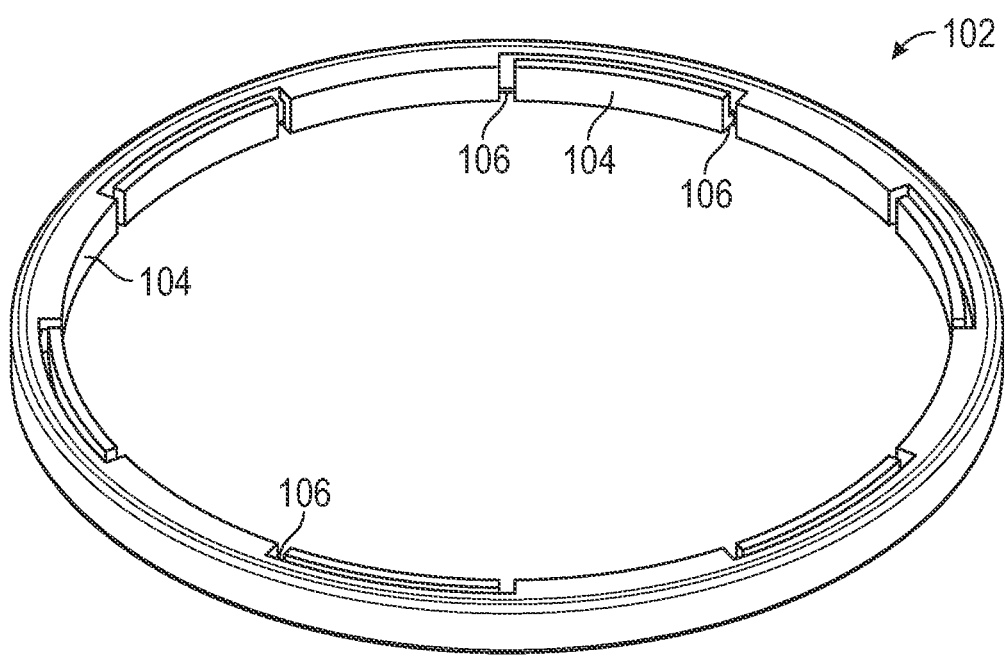
FIG. 12 is a front perspective view of a sixth implementation of a seal ring.
Figure 13:
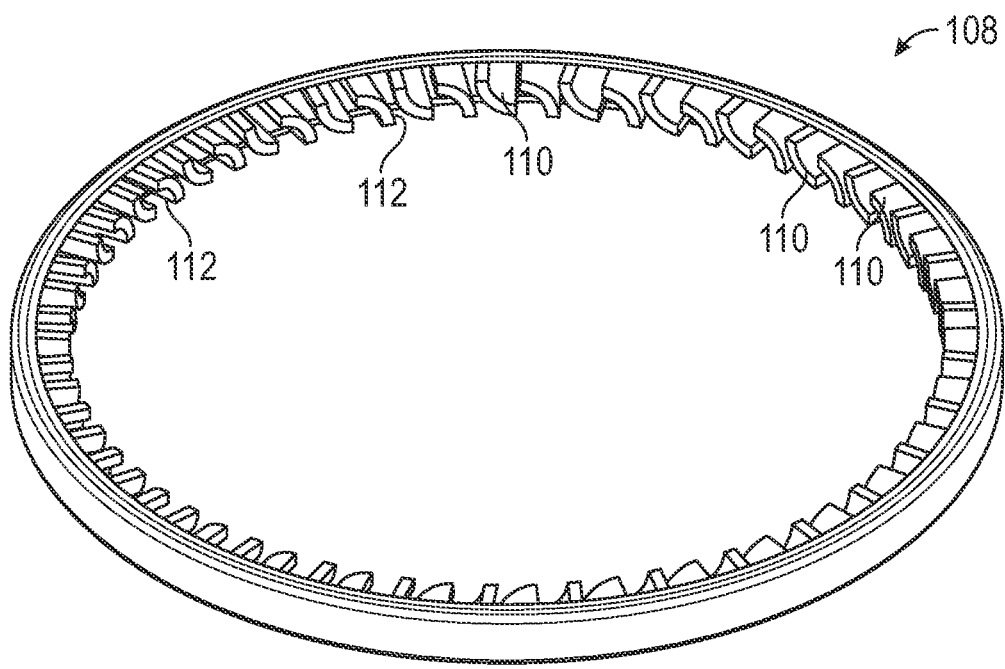
FIG. 13 is a front perspective view of a seventh implementation of a seal ring.
Figure 14:
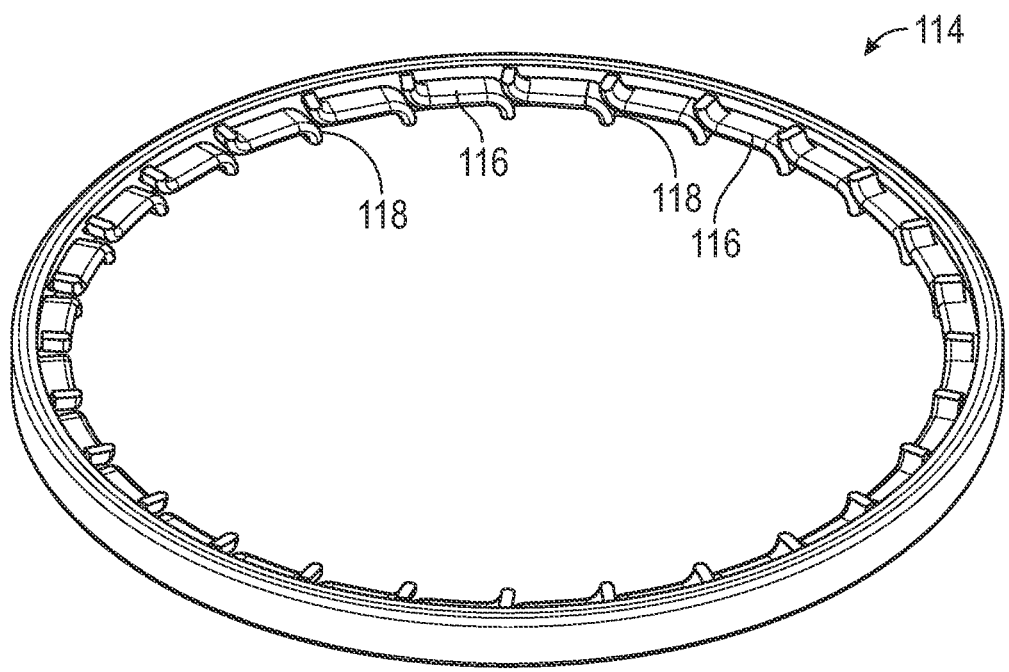
FIG. 14 is a front perspective view of an eighth implementation of a seal ring.

Referring to FIGS. 12 through 14, other implementations of seal rings having a plurality of openings therethrough are illustrated. The seal ring 8 of FIG. 1 may be replaced by any of the seal rings of FIGS. 12-14 which may function the same as the seal ring of FIG. 1 inasmuch as each of the seal rings include a plurality of openings that remain open as an inner container is inserted within the outer container until the inner container is fully inserted, or nearly fully inserted, within the outer container, at which point the plurality of openings are closed and a vacuum is created within the outer container through the seal ring.

Referring specifically to FIG. 12, a front perspective view of a sixth implementation of a seal ring is illustrated. In various implementations, the seal ring 102 may include a plurality of the L-shaped flaps 104. The plurality of L-shaped flaps 104 may alternate in orientation. In other implementations, each of the L-shaped flaps may be oriented in the same orientation. In various implementations, a plurality of openings 106 may separate each of the L-shaped flaps from one another. Similar to the plurality of slits 52 of FIG. 7, the plurality of openings 106 allow for an inner container to be secured within an outer container through a pressure differential created by the seal ring 102.

Referring specifically to FIG. 13, a front perspective view of a seventh implementation of a seal ring is illustrated. In various implementations, the seal ring 108 may include a plurality of the C-shaped flaps 110. The plurality of C-shaped flaps 110 may alternate in orientation. In other implementations, each of the C-shaped flaps may be oriented in the same orientation. In various implementations, a plurality of openings 112 may separate each of the C-shaped flaps from one another. As an inner container having tapered sidewalls is inserted within an outer container, the inner container simultaneously reduces the size of the plurality of openings 112 by pushing the C-shaped flaps 110, which may partially overlap one another, towards one another while also having the increasing size of the diameter of the inner container fill the plurality of openings. In turn, the plurality of openings allow for an inner container to be secured within an outer container through a pressure differential created by the seal ring 108 once the plurality of openings are closed.

Referring specifically to FIG. 14, a front perspective view of an eighth implementation of a seal ring is illustrated. In various implementations, the seal ring 114 may include a plurality of S-shaped flaps 116. The plurality of S-shaped flaps 116 may alternate in orientation. In other implementations, each of the S-shaped flaps may be oriented in the same orientation. In various implementations, a plurality of openings 118 may separate each of the S-shaped flaps from one another. As an inner container having tapered sidewalls is inserted within an outer container, the inner container simultaneously reduces the size of the plurality of openings 118 by pushing the S-shaped flaps 116, which may partially overlap one another, towards one another while also having the increasing size of the diameter of the inner container fill the plurality of openings. In turn, the plurality of openings allow for an inner container to be secured within an outer container through a pressure differential created by the seal ring 114 once the plurality of openings are closed.

While FIGS. 7 and 12-14 all illustrated seals rings having particular openings therethrough (which openings are not closed), in other implementations the seal ring may include other shapes and designs of openings and flaps between the openings which may be located at other portions of the seal ring. Such implementations may lock an inner container within an outer container similar to the seal rings of FIGS. 7 and 12-14.

While the seal rings of FIG. 7 through 14 illustrate plurality's of openings as extending entirely around the circumference of the seal ring with the openings of the plurality of openings evenly spaced from one another, in other implementations a plurality of openings may not extend entirely around the circumference of the seal ring or the openings may not be evenly spaced apart from other openings of the plurality of openings.

Figure 15:
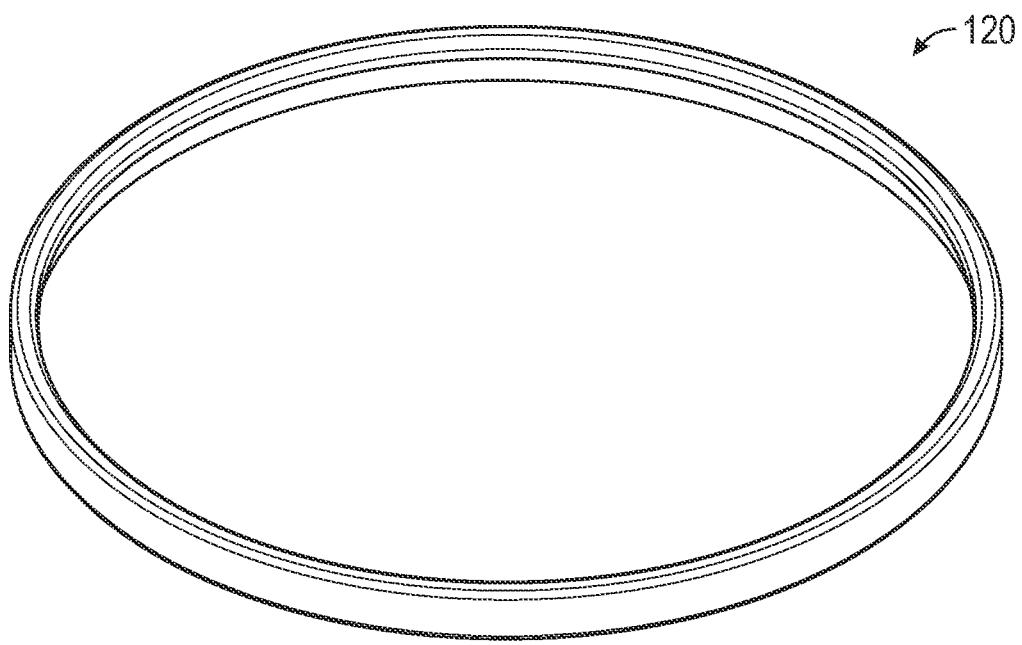
FIG. 15 is a front perspective view of a ninth implementation of a seal ring.

Referring to FIG. 15, a front perspective view of a ninth implementation of a seal ring is illustrated. In various implementations the container may include a seal ring 120 without a plurality of openings therethrough. In such implementations, the seal ring 120 may be located within an outer container similar to other implementations of the seal rings disclosed herein. When the inner container enters the outer container, the inner container may contact an entire perimeter of the seal ring 120 and prevent the inner container from fully entering the outer container. In such implementations, a user may push the inner container into the outer container with a rocking motion which breaks the seal between the seal ring 120 and the inner container and allows air within the outer container displace by the inner container to escape through the broken seal. In turn, the inner container may be fully inserted within the outer container and may be secured within the outer container through the pressure differential created through the seal ring 120. Similar to other implementations disclosed herein, when the user desires to remove the inner container from the outer container the user may be required to rock the inner container in a back and forth motion while pulling it away from the outer container in order to break the vacuum seal and separate the inner container from the outer container.

In places where the description above refers to particular implementations of beverage container and implementing components, sub-components, methods and sub-methods, it should be readily apparent that a number of modifications may be made without departing from the spirit thereof and that these implementations, implementing components, sub-components, methods and sub-methods may be applied to other beverage container.

What is claimed is:

1. A beverage container comprising:
an outer container;
an inner container configured to removably couple within the outer container;
a seal ring directly coupled to an inner perimeter of the outer container, the seal ring comprising a plurality of openings therein;
wherein the plurality of openings are configured to fully close upon the inner container being fully inserted within the outer container; and
wherein the seal ring is configured to lock the inner container within the outer container through a pressure differential.

2. The beverage container of claim 1, wherein the outer container comprises vacuum insulated double walls.

3. The beverage container of claim 1, wherein the inner container comprises measurement markings oriented in a frontwards direction when viewed from an interior of the inner container.

4. The beverage container of claim 1, wherein each opening of the plurality of openings comprises a slit that is accessible from an inner perimeter of the seal ring.

5. The beverage container of claim 1, wherein the seal ring comprises a plurality of flaps with each flap of the plurality of flaps separated from an adjacent flap by an opening of the plurality of openings.

6. The beverage container of claim 1, wherein the seal ring comprises a rubber material.

7. The beverage container of claim 1, wherein a sidewall of the inner container only contacts a sidewall of the outer container at an end of the outer container comprising an opening.

8. A beverage container comprising:
an outer container;
an inner container configured to removably couple within the outer container, the inner container comprising a tapered sidewall; and
a seal ring directly coupled to an inner perimeter of the outer container, the seal ring comprising a plurality of openings therein;
wherein the plurality of openings are configured to allow air within the outer container to escape therethrough when the inner container is being inserted into the outer container;
wherein the plurality of openings are configured to fully close when the inner container is inserted completely in the outer container; and
wherein the seal ring is configured to lock the inner container within the outer container through a pressure differential.

9. The beverage container of claim 8, wherein the plurality of openings comprise a plurality of slits accessible from an inner perimeter of the seal ring.

10. The beverage container of claim 8, wherein the seal ring comprises a plurality of flaps, each flap separated from an adjacent flap by an opening of the plurality of openings.

11. The beverage container of claim 10, wherein each flap comprises a C-shape.

12. The beverage container of claim 10, wherein each flap comprises an S-shape.

13. The beverage container of claim 8, wherein the seal ring comprises an outer portion directly coupled to the outer container and an inner portion directly coupled to the inner portion, wherein a gap separates the inner portion from the outer portion.

14. A beverage container comprising:
an insulated outer container;
an inner container configured to removably couple within the insulated outer container, the inner container comprising a tapered sidewall; and
a seal ring directly coupled to an inner perimeter of the insulated outer container, the seal ring comprising a plurality of slits accessible from an inner perimeter of the seal ring;
wherein the plurality of slits are configured to allow air within the insulated outer container to escape therethrough when the inner container is being inserted into the insulated outer container;
wherein the plurality of slits are configured to fully close when the inner container is inserted completely in the insulated outer container; and
wherein the seal ring is configured to lock the inner container within the insulated outer container through a pressure differential.

15. The beverage container of claim 14, wherein the inner container comprises a first set of measurement markings oriented in a frontwards direction when viewed from an interior of the inner container and a second set of measurement markings oriented in the frontwards direction when viewed from the interior of the inner container.

16. The beverage container of claim 14, wherein a vacuum is configured to be formed within the insulated outer container when the inner container is inserted completely within the insulated outer container.

17. The beverage container of claim 14, wherein the inner container comprises a portion having an outer diameter one of the same size or larger than a diameter of an outer perimeter of an end of the insulated outer container comprising an opening.

18. The beverage container of claim 14, wherein the insulated outer container is vacuum insulated.

19. The beverage container of claim 14, wherein the seal ring comprises an outer portion directly coupled to the insulated outer container and an inner portion directly configured to couple to the inner container, wherein a gap separates the inner portion from the outer portion.

* * * * *